United States Patent
Finke et al.

(10) Patent No.: US 10,673,636 B1
(45) Date of Patent: *Jun. 2, 2020

(54) SYSTEM AND APPARATUS FOR PROVIDING AUTHENTICABLE ELECTRONIC COMMUNICATION

(71) Applicants: Benjamin Finke, St Johns, FL (US); Christopher Freedman, Ponte Vedra Beach, FL (US)

(72) Inventors: Benjamin Finke, St Johns, FL (US); Christopher Freedman, Ponte Vedra Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/548,178

(22) Filed: Aug. 22, 2019

Related U.S. Application Data

(63) Continuation of application No. 16/458,693, filed on Jul. 1, 2019, now abandoned.

(60) Provisional application No. 62/809,669, filed on Feb. 24, 2019.

(51) Int. Cl.
*H04L 29/06* (2006.01)
*H04L 9/32* (2006.01)
*H04L 12/58* (2006.01)

(52) U.S. Cl.
CPC ............ *H04L 9/3247* (2013.01); *H04L 51/18* (2013.01)

(58) Field of Classification Search
CPC ........ H04L 51/12; H04L 51/18; H04L 9/3247
USPC ........................................................ 713/170
See application file for complete search history.

(56) References Cited

U.S. PATENT DOCUMENTS

| | | | |
|---|---|---|---|
| 8,510,820 B2* | 8/2013 | Oberheide | H04L 63/0272 709/203 |
| 8,578,454 B2 | 11/2013 | Grim | |
| 9,077,769 B2 | 7/2015 | Krzeminski et al. | |
| 9,118,656 B2 | 8/2015 | Ting et al. | |
| 9,282,085 B2 | 3/2016 | Oberheide et al. | |
| 9,355,231 B2 | 5/2016 | Disraeli | |
| 9,356,921 B2 | 5/2016 | Kanov et al. | |
| 9,582,802 B2 | 2/2017 | Bachenheimer et al. | |
| 9,639,825 B1 | 5/2017 | Roth et al. | |

(Continued)

OTHER PUBLICATIONS

NPL Search Results (Year: 2019).*
NPL Search Results (Year: 2020).*

*Primary Examiner* — Syed A Zaidi
(74) *Attorney, Agent, or Firm* — Wilson Dutra, PLLC; Camille A. Wilson

(57) ABSTRACT

The present disclosure provides generally for system and method of authenticating a source of electronic communication. According to the present disclosure, authenticable communications may allow for authentication of a source of the electronic communication, which may limit potential damage caused by fraudulent communications. In some aspects, an authenticable communication may allow the recipient to confirm that the indicated source is the actual source of the authenticable communication. In some embodiments, the authentication may not require an exchange of encrypted communications or an exchange of communications solely within the same communication system. Authenticable communications may provide a separate layer of security that may allow a recipient to review the contents with confidence that the communication is not fraudulent. Further, authenticable communications may provide the additional security without requiring specialized software.

18 Claims, 16 Drawing Sheets

(56) References Cited

U.S. PATENT DOCUMENTS

| | | | |
|---|---|---|---|
| 9,847,874 B2 | 12/2017 | Merdinger et al. | |
| 10,129,250 B2 | 11/2018 | Oberheide et al. | |
| 2003/0236847 A1* | 12/2003 | Benowitz | H04L 51/12 709/206 |
| 2004/0181581 A1* | 9/2004 | Kosco | G06Q 10/107 709/206 |
| 2004/0236838 A1* | 11/2004 | Tout | G06F 21/554 709/207 |
| 2005/0144449 A1* | 6/2005 | Voice | G06F 21/34 713/169 |
| 2005/0144450 A1* | 6/2005 | Voice | G06F 21/34 713/169 |
| 2006/0053293 A1* | 3/2006 | Zager | G06Q 10/107 713/176 |
| 2006/0200530 A1* | 9/2006 | Tokuda | H04L 51/14 709/206 |
| 2007/0005967 A1* | 1/2007 | Mister | G06F 21/36 713/168 |
| 2015/0149775 A1 | 5/2015 | Gadotti | |
| 2018/0176222 A1 | 6/2018 | Bhaskar | |
| 2018/0295153 A1 | 10/2018 | Eisen | |

* cited by examiner 410 
420 
430 
440 
450

510

SYSTEM AND APPARATUS FOR PROVIDING AUTHENTICABLE ELECTRONIC COMMUNICATION

CROSS-REFERENCE TO RELATED APPLICATION

This application claims priority to and the full benefit of U.S. Nonprovisional patent application Ser. No. 16/458,693 (filed Jul. 1, 2019, and titled "SYSTEM AND APPARATUS FOR PROVIDING AUTHENTICABLE ELECTRONIC COMMUNICATION"), which claimed priority to and the full benefit of U.S. Provisional Patent Application Ser. No. 62/809,669 (filed Feb. 24, 2019, and titled "SYSTEM AND APPARATUS FOR PROVIDING AUTHENTICABLE ELECTRONIC COMMUNICATION"), the entire contents of which are incorporated in this application by reference.

BACKGROUND OF THE DISCLOSURE

Forgery has perplexed and stymied human trust since writing and the use of paper became pervasive, particularly for financial transactions. One of the first prohibitions against forgery was when the Romans outlawed falsifying documents that transferred land to heirs. Over time the extent of forgery broadened to include tampering, counterfeiting, and misrepresentation. Illegitimate conveyances evolved into falsifying paper notes as well. For example, in England during the early $19^{th}$ century, 1-pound notes were incredibly easy to replicate, which lead to the mass incarceration of approximately 100,000 people over a 7-year period. Laws continually developed to match the sophistication levels of those committing the forgery, though it was still difficult to identify incredibly convincing forgeries.

With the promulgation of technology, these issues increased a hundredfold. Where technology is meant to improve the quality of life and streamline certain processes, the continued concern of forgery or misrepresentation has denied more sensitive transactions the benefit of technology. Complex financial transactions or something as relatively straightforward as a house closing still rely on traditional methods of approval and confirmation. Certain banks warn consumers not to trust email communications sent from them or not to respond to phone calls where someone claims to be a representative from the bank. As a result, despite all the innovation that has occurred, the old models remain, meaning people still need to appear in person or by proxy for anything involving money transferring hands.

The problem continues even for less sensitive, but still incredibly critical, communications. Employees are now warned that, because of the sophistication of external technologies and techniques like phishing, not to click on certain emails or not to click on links within an email, even when those emails are purportedly from someone within their own company. This is compounded when an employee regularly receives communication from someone like a financial officer who has time constraints on closing a matter that involves money and expects the employee to diligently follow through on their requests. Sometimes the volume is such that it does not make sense for the financial officer to personally appear and make each request to the employee.

As a result, email authentication is used to prevent phishing, spoofing, spamming, and other forms of fraud. Because of the rising sophistication of these techniques, false senders were able to get passwords, account information, personally identifiable information, and financial information. False senders may also manipulate recipients to take certain actions, which could be harmful to themselves or others. Email authentication may help an internet service provider (ISP) properly identify the sender of an email and intercept or prevent these communications from going through. This practice is meant to simplify and automate the process of identifying a sender and is also supposed to improve the likelihood that a legitimate email goes to its intended recipient.

Three major forms of email authentication systems include the sender policy framework (SPF), the DomainKeys identified mail (DKIM) method, and the Domain-based Message Authentication, Reporting, and Conformance (DMARC) system. SPF cross-checks the domain in a sender's email against the published record the sender has registered in the Domain Name System (DNS). DKIM is a cryptographic, signature-based form of email authentication, where public/private key pairs are generated and checked against each other to ensure that the message was not altered and was from the original sender. DMARC mixes the SPF and DKIM systems, which allows an administrator to specify which mechanism is used when sending an email from their domain. DMARC does not directly address whether an email is spam or fraudulent. Instead, it requires that a message passes either DKIM or SPF validation as well as a process called alignment.

Despite these current solutions to email communication authentication, it is clear the solutions require extensive integration and technical understanding that may confuse and unnecessarily complicate an everyday email user. Organizations with complex systems may be able to educate employees or customers to these methods, but there is still a steep education curve involved as well as an implementation process. Further, some of these authentication processes still cannot indicate whether an email is fraudulent.

SUMMARY OF THE DISCLOSURE

What is needed is a streamlined system and method to authenticate the source or origin of an electronic communication on an individual or organization-wide basis. This would allow a recipient to confirm whether the message is actually from an indicated source. In some embodiments, an authentication system may generate various options to authenticate a source. In some implementations, an authentication system may require a recipient to actively enter in a password or code that correlates to the indicated source before a message is shown. In some aspects, an authentication system may contact the indicated source to confirm or reject the validity of the authenticable communication. In some implementations, an authentication system may exist as an external application or may be a plug in for existing technology, such as an enterprise application or a communication system, as non-limiting examples.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

The present disclosure relates to a system for providing authenticable communication, wherein the system may comprise: one or more processors; one or more memory resources comprising: an authentication mechanism database; an indicated source database; and wherein the one or more memory resources are connectable to one or more external device through a communications network, wherein at least one of the one or more external devices may comprise an authenticable communication transmittal mechanism and at least one of the one or more external devices may comprise an authenticable communication receiving mechanism, wherein the one or more memory resources are executable by the one or more processors to perform the steps of: receiving an electronic communication comprising at least an indicated source, at least one recipient, and content; converting the electronic communication to an authenticable communication, wherein converting may comprise integrating at least one source authentication mechanism into the electronic communication, wherein the at least one source authentication mechanism allows the at least one recipient to authenticate the indicated source as an actual source; transmitting the authenticable communication to the at least one recipient.

Implementations may comprise one or more of the following features. In some aspects, the at least one source authentication mechanism may be selectable by the indicated source. In some embodiments, the at least one source authentication mechanism is selectable by the at least one recipient. In some implementations, the at least one source authentication mechanism may comprise generation of an authentication code, wherein the authentication code may be used to confirm that the indicated source is the actual source. In some aspects, each of the at least one recipient receives a unique authentication code. Implementations of the described techniques may comprise hardware, a method or process, or computer software on a computer-accessible medium.

In some aspects, corresponding computer systems, apparatus, and computer programs recorded on one or more computer storage devices, may be configured to perform the actions of the methods.

The present disclosure relates to a system for providing source authentication for authenticable communication, wherein the system may comprise: one or more processors; one or more memory resources; an authentication mechanism database; and an indicated source database; wherein the one or more memory resources are connectable to external devices through a communications network, wherein at least one external device may comprise an authenticable communication transmittal mechanism and at least one external device may comprise an authenticable communication receiving mechanism, wherein the one or more memory resources are executable by the one or more processors to perform the steps of: receiving a primary authentication request for an authenticable communication, wherein the authenticable communication may comprise an indicated source, one or more recipient, and content; accessing the authenticable communication; identifying an indicated source of the authenticable communication; identifying an actual source of the authenticable communication; authenticating the authenticable communication by comparing the indicated source to the actual source, wherein comparing produces an authentication result that confirms whether the indicated source and the actual source are the same; and transmit the authentication result.

Implementations may comprise one or more of the following features. In some aspects, the one or more memory resources may be further executable to perform the steps of: receiving an authentication type with the primary authentication request, wherein a method for identifying the actual source is based on the authentication type. In some implementations, the primary authentication request may be received automatically when each of the one or more recipient of the authenticable communication accesses the authenticable communication. In some embodiments, the primary authentication request may be received automatically when each of the one or more recipient of the authenticable communication transmits the primary authentication request.

In some embodiments, contents of the authenticable communication may be accessible if the authentication results indicates that the indicated source is the actual source. In some aspects, receiving a primary authentication request may occur within a software application provided by the indicated source. In some implementations, the one or more memory resources may be further executable to perform the steps of: transmitting a secondary authentication request to the indicated source; and receiving an authentication response from the indicated source, wherein the authentication response informs the identifying of the actual source. In some aspects, the one or more memory resources may be further executable to perform the steps of: transmitting a recipient confirmation request to the indicated source, wherein the recipient confirmation request prompts confirmation that each of the one or more recipient is permitted to view the content. Implementations of the described techniques may comprise hardware, a method or process, or computer software on a computer-accessible medium. In some aspects, corresponding computer systems, apparatus, and computer programs recorded on one or more computer storage devices, may be configured to perform the actions of the methods.

The present disclosure relates to a computer-implemented method for authenticating a source of an authenticable communication, the computer-implemented method comprising method steps of: receiving a primary authentication request for an authenticable communication, wherein the authenticable communication may comprise an indicated source, one or more recipient, and content; accessing the authenticable communication; identifying an indicated source of the authenticable communication; identifying an actual source of the authenticable communication; authenticating the authenticable communication by comparing the indicated source to the actual source, wherein comparing produces an authentication result that confirms whether the indicated source and the actual source are the same; and transmitting the authentication result.

Implementations may comprise one or more of the following features. In some aspects, the computer-implemented method may further comprise the steps of: receiving an authentication type with the primary authentication request, wherein a method for identifying the actual source is based on the authentication type. In some embodiments, the primary authentication request may be received automatically when each of the one or more recipient of the authenticable communication accesses the authenticable communication. In some implementations, the primary authentication request may be received automatically when each of the one or more recipient of the authenticable communication transmits the primary authentication request. In some aspects, contents of the authenticable communication may be accessible if the authentication results indicates that the indicated source is the actual source.

In some embodiments, the computer-implemented method further may comprise method steps of: transmitting a secondary authentication request to the indicated source;

and receiving an authentication response from the indicated source, wherein the authentication response informs the identifying of the actual source. In some aspects, the computer-implemented method may further comprise the method steps of: transmitting a recipient confirmation request to the indicated source, wherein the recipient confirmation request prompts confirmation that each of the one or more recipient is permitted to view the content. Implementations of the described techniques may comprise hardware, a method or process, or computer software on a computer-accessible medium.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
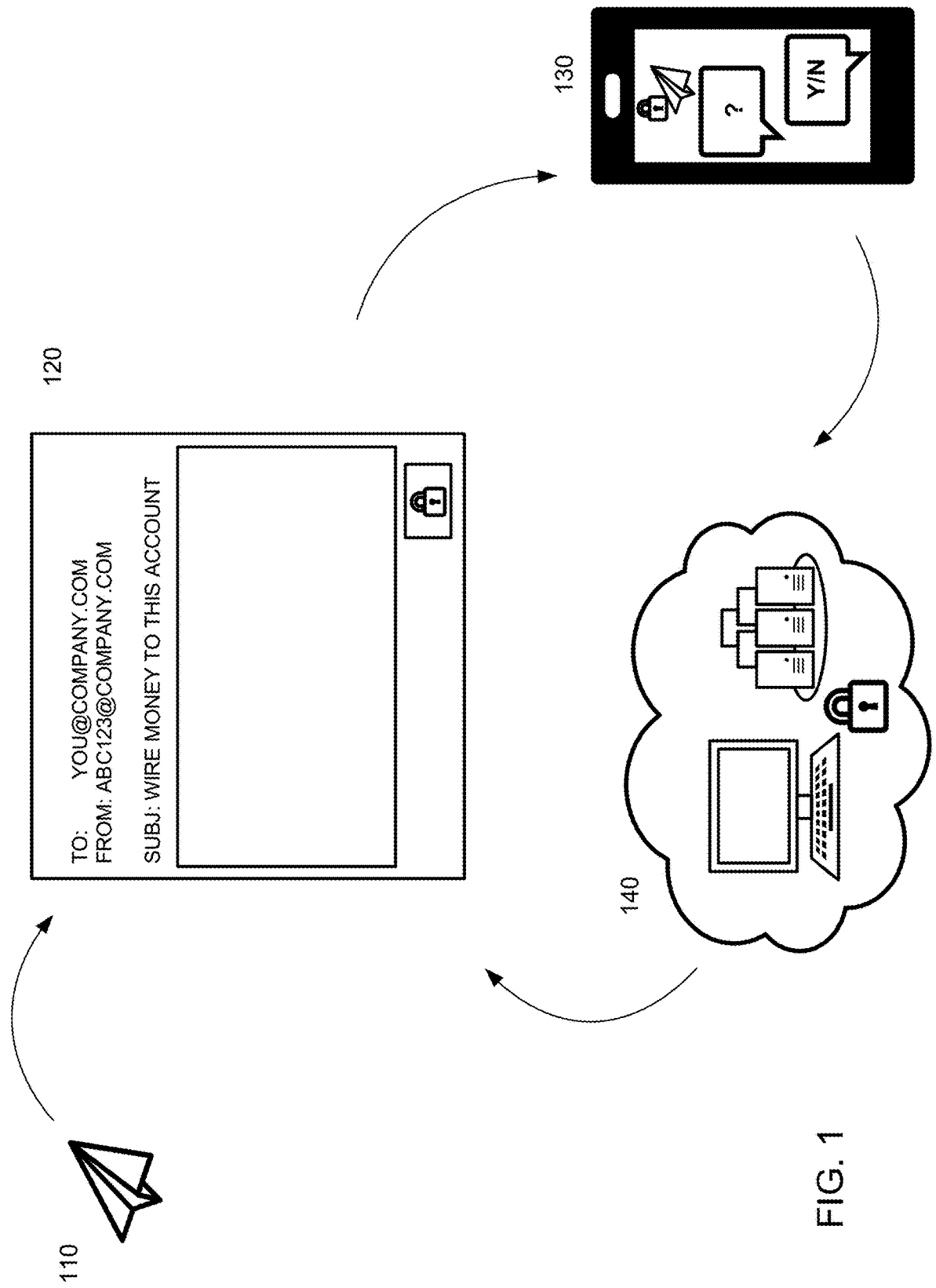
FIG. 1 illustrates an exemplary system of source authentication of an authenticable communication, according to some embodiments of the present disclosure.

The present disclosure provides generally for system and method of authenticating a source of electronic communication. According to the present disclosure, authenticable communications may allow for authentication of a source of the electronic communication, which may limit potential damage caused by fraudulent communications. In some aspects, an authenticable communication may allow the recipient to confirm that the indicated source is the actual source of the authenticable communication. In some embodiments, the authentication may not require an exchange of encrypted communications or an exchange of communications solely within the same communication system. Authenticable communications may provide a separate layer of security that may allow a recipient to review the contents with confidence that the communication is not fraudulent. Further, authenticable communications may provide the additional security without requiring specialized software.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Authenticable Communication: as used herein refers to an electronic communication with at least one source authentication mechanism. In some aspects, an electronic communication may comprise a direct communication from a source to a recipient, such as an email, telemedicine, teleconferencing, video conferencing, or reservations. In some embodiments, an electronic communication may not have a specific recipient, such as a video, social media post, ad, video games, or article. In some implementations, an authenticable communication may be sent through an authenticable communication transmittal mechanism, such as an email application, enterprise application, authentication module, or other communication system.

Source Authentication: as used herein refers to verifying or confirming the source of an electronic communication. In some aspects, the source may be an individual person, such as a sender of an email or an author of an article. In some embodiments, the source may be an entity, such as an enterprise, business, or group. In some implementations, source authentication may occur by comparing an indicated source of an authenticable communication with the actual source. In some embodiments, the authenticable communication may further allow for verification that the recipient was the intended recipient.

Indicated Source: as used herein refers to an apparent source of an authenticable communication. For example, an indicated source may comprise an email address of a sender. In some aspects, a source may be indicated through branding or labeling on or near the authenticable communication. For example, an indicated source may comprise a person associated with a known social media handle, wherein the social media handle may be the apparent poster of a social media post. As another example, an indicated source may comprise an entity associated with a logo, wherein the logo may be embedded in a video.

Actual Source: as used herein refers to the true source of an authenticable communication. In some aspects, source authentication may confirm the indicated source and the actual source are the same. In some embodiments, source authentication may reject the indicated source and may find that the actual source of the authenticable communication is not the indicated source.

Referring now to FIG. 1, an exemplary system of source authentication of an authenticable communication 120 is illustrated. In some aspects, a source 110 may comprise a person or entity. In some embodiments, the authenticable communication 120 may comprise an indicated source, recipient, subject, and text body. In some implementations, the recipient may want to authenticate the source of the authenticable communication 120, such as where the authenticable communication 120 may include personal information, financial instruction, or other private communication.

In some aspects, a recipient may request source authentication, such as by clicking an icon within the email application. In some implementations, an authentication request may be transmitted to an indicated source 130. In some embodiments, a source authentication may comprise sending a text message to a phone number associated with the indicated source 130. In some aspects, a profile may be associated with a source, which may allow for the transmission of authentication requests when the indicated source is associated with the profile.

In some implementations, the response to the authentication request may be transmitted to an authentication system 140. In some aspects, the result of the authentication result may be transmitted back to the recipient. For example, a positive result may change an icon to a green check mark, and a negative result may change an icon to a red stop sign, which may indicate that the indicated source is not the actual source, such as through spoofing.

Figure 2A:
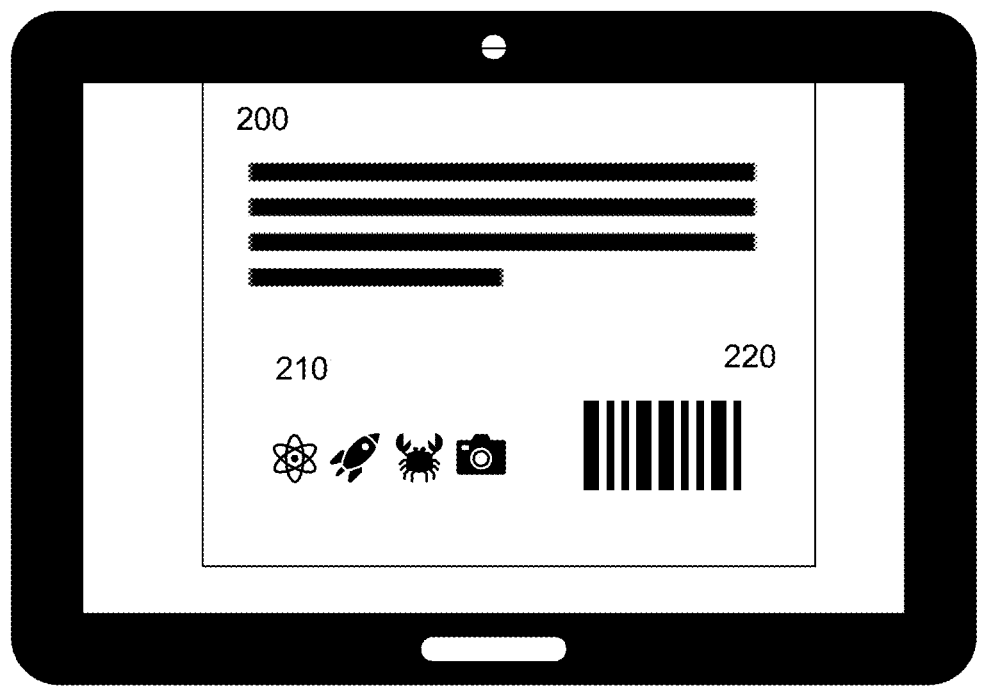
FIG. 2A illustrates an exemplary authenticable communication with an icon authentication and barcode authentication, according to some embodiments of the present disclosure.
Figure 2B:
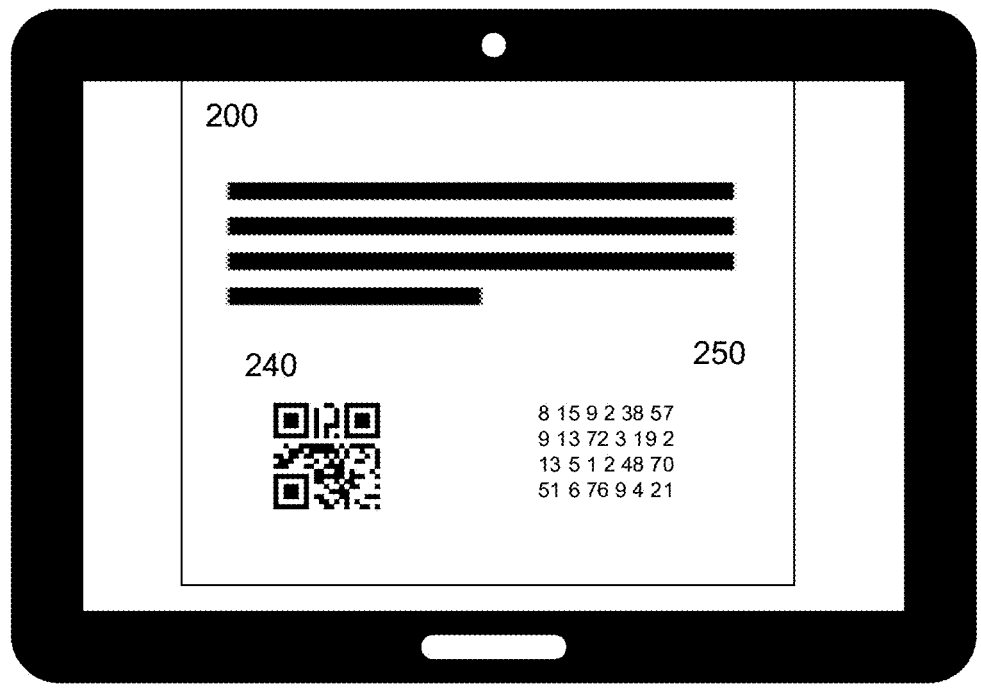
FIG. 2B illustrates an exemplary authenticable communication with a QR code authentication and a numeric grid, according to some embodiments of the present disclosure.

Referring now to FIG. 2A, an exemplary authenticable communication 200 with an icon authentication 210 and barcode authentication 220. Referring now to FIG. 2B, an exemplary authenticable communication 200 with a QR code authentication 240 and a numeric grid 250. In some aspects, the authenticable communication 200 may comprise a phone number that a recipient may call to confirm that the indicated sender is the actual sender. As part of the authentication, the phone number may connect the recipient to an authentication system. The authentication system may be automated, personal, or combinations thereof. The authentication system may confirm at least a portion of the authentication, such as for the icon authentication 210 or numeric grid 250.

In some embodiments, customer service may send an authenticable communication to a customer who is calling in as a substitute for requesting for confidential information. For example, typically, customer service may request a portion of the customer's social security number, and instead, by request or as part of a standard protocol, customer service may send the authenticable communication and request that the customer provide a portion of an identifier within the authenticable communication. This may limit exchange of personal and confidential information.

In some aspects, the authenticable communication 200 may comprise a physical document, such as a letter sent through the mail. In some embodiments, an authenticable communication 200 may be scanned to read a barcode authentication 220. Depending on the indicated source, the scanning may occur through an enterprise software or through a centralized software that may process authenticable communications 200 for multiple indicated sources. For example, the IRS or a large bank may provide an internal authentication module within their existing application or website. Hosting the programming within the enterprise may increase the sense of security and confidence a recipient may have in the authentication. It may also keep the data internal without requiring exchange of personal data or secure information through external servers.

In some implementations, the authenticable communication 200 may be split into multiple communications, which may comprise combinations of digital correspondence and paper correspondence. For example, a recipient may receive a physical letter with the icon identification 210 prompting the recipient to log into their account for the contents of their authenticable communication 200, which may only be accessible once the recipient correctly inputs the requested icons from the icon identification 210. Similarly, a recipient may receive a digital email with the icon identification 210 that may prompt the recipient to log into a portal to retrieve the content of the authenticable communication. In some aspects where the authenticable communication 200 may comprise multiple parts, the parts combined may be considered the authenticable communication. In some embodiments where the authenticable communication 200 may comprise multiple parts, at least some of the separate parts may be considered separate authenticable communications, including secondary authenticable communications.

In some embodiments, the authenticable communication 200 may comprise a product label that a recipient or potential purchaser may scan to authenticate the indicated source as well as other product characteristics. For example, a recipient may want to verify whether a product is actually from the manufacturing company associated with a brand and not a knock off. As another example, a recipient may want to verify a quality of the product, such as a manufacturing origin, certifications, or general authenticity. In some aspects, actual sources may provide an authentication module or participate in a collective authentication module where recipients may authenticate authenticable communications 200.

Figure 3:
FIG. 3 illustrates an exemplary graphical user interface (GUI) for an authentication system, according to some embodiments of the present disclosure.

Referring now to FIG. 3, an exemplary graphical user interface (GUI) 300 for an authentication system is illustrated. In some aspects, the method of authentication 310 may be customizable, such as by a source, recipient, authentication application, or source enterprise, as non-limiting examples. In some embodiments, the GUI 300 may allow a source to pre-select methods of authentication 310, which may include text, image capture, email, phone call, handwriting recognition, facial recognition, or voice recognition, as non-limiting examples.

Where the source may pre-select methods of authentication 310, the source may also provide the base data for the methods of authentication 310. For example, the source may provide the best phone number or email address where the method of authentication 310 may comprise text or email. As another example, the method of authentication 310 may comprise facial recognition, and the GUI 300 may prompt facial capture to store the authenticating facial data. As another example, where the methods of authentication 310 may comprise voice or handwriting recognition, the GUI 300 may prompt input of baseline data. For voice recognition, the source may be prompted to speak a list of words or sounds, which may allow for a randomized authentication. For handwriting recognition, the source may be prompted to write a series of words or letters.

In some embodiments, the GUI 300 may be provided to a recipient or viewer, which may allow the recipient or viewer to select their preferred method of authentication 310. In some aspects, the selection of the method of authentication 310 may be pre-set as a standard for authenticable communications. In some implementations, the selection may occur for each authenticable communication. In some aspects, the methods of authentication 310 may be ranked by preference, wherein the authentication system may offer the method of authentication 310 with the highest ranking if there are multiple methods of authentication 310 offered with the authenticable communication.

As an illustrative example, a recipient may prefer text authentication, facial recognition authentication, then phone call authentication. Where an authenticable communication may provide either phone call authentication or text authentication, the authenticating system may offer the recipient only the text authentication. Where an authenticable communication may only offer handwriting authentication, the recipient may still be given the option to request the authentication based on handwriting authentication.

In some aspects, a recipient may decide to not authenticate an authenticable communication. Were the recipient to decline authentication, one or both the authenticable communication and authentication system may contain or provide a disclaimer of liability related to the content within the authenticable communication. Where the authentication system may be integrated as an add-on to a communication system, the unauthenticated communication may be highlighted or flagged as potentially fraudulent until or unless the recipient successfully authenticates the communication.

In some embodiments, a source may refuse to authenticate or an authentication may fail. In those cases, the recipient may receive a failure notification that warns against downloading, clicking, or performing any requested action prompted by the authenticable communication. In some aspects, such as through an add-on feature to a communication application, a failed authentication may cause a cautionary step, such as automatically deleting, blurring, or disabling the authenticable communication. In some implementations, such as where the authentication is controlled by an enterprise, a failure may further prompt reporting the failure to a regulating body, such as to an IT department, compliance department, or to the authentication system, as non-limiting examples. The reporting may flag one or more the type of authenticable communication, the authenticable communication, or indicated source of the authenticable communication as potentially fraudulent.

For example, an enterprise source may be an indicated source for a mass distribution authenticable communication. As authentications fail for the authenticable communication, a reporting may allow the enterprise to take precautionary steps to limit any damage caused by the fraudulent communication. The enterprise may send out an alert to potential recipients to ignore and delete the fraudulent communication. Where practical, the enterprise may revoke the fraudulent communication.

As another example, an individual source may be an indicated source for an authenticable communication requesting a transfer of funds to a specific account through an included link. A failed authentication may alert the individual that their systems may have been corrupted, hacked, or compromised in some way. The individual may be able to store the fraudulent communication with their profile as a mechanism to potentially identify patterns of fraud. For example, if a second authentication fails with the same content, the authentication system may be able to identify a pattern, which may allow for a better understanding of the fraudulent communication.

In some aspects, the authentication system may link or share fraud data between users, which may allow for the anticipation of fraudulent communications. For example, the authentication system may identify an enterprise phishing scam email. One or both the language and the actual source may be stored and flagged, wherein similar emails received from different enterprises or users may be more easily identified as fraud. In some embodiments, the authentication system may be accessed through a subscription model, such as by allowing a fixed number or type of authentication.

Figure 4:
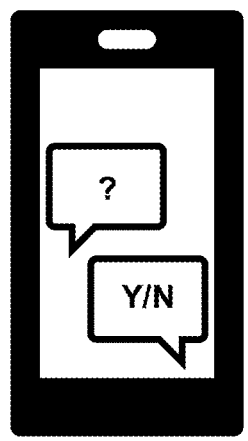
FIG. 4 illustrates exemplary authentication methods, according to some embodiments of the present disclosure.
Figure 4:
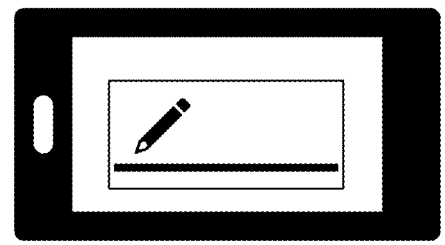
Figure 4:
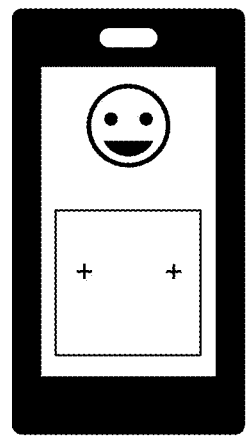
Figure 4:
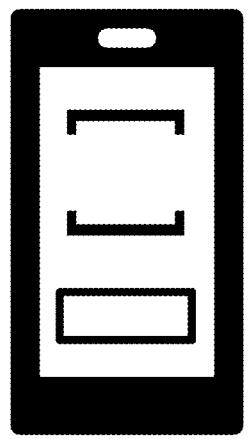
Figure 4:
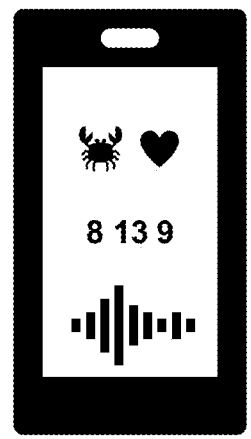

Referring now to FIG. 4, exemplary authentication methods 410, 420, 430, 440, 450 are illustrated. In some aspects, a method of authentication may depend on user settings, recipient communication settings, authenticable communication settings, source communication settings, authentication application. In some embodiments, the authentication application may comprise a separate authentication application or portal, a feature within an enterprise application, or an add-on feature within the communication system.

In some implementations, authenticable communication may require multiple levels of authentication. In some aspects, one or more a source, recipient, or platform may set the number and types of authentication. In some embodiments, there may be a default authentication method, such as a handwriting recognition 420, bar code recognition 440, text authentication 410, or voice recognition, wherein the authentication data may be stored with a source profile. In some implementations, a recipient may request a separate type of authentication, which may or may not be verified or stored with the source profile. For example, a recipient may request a facial recognition snapshot 430, which may allow the recipient to confirm the source independently. Randomized or custom authentication requests may provide a further layer of protection against fraud.

In some aspects, an authenticable communication may require a multi-layered authentication 450, such as requiring an icon selection, numeric matching, and voice recognition. A multi-layered authentication 450 may provide increased security against fraud. For example, a multi-layered authentication 450 may be useful where the authenticable communication may be requesting a financial transaction, social security number, or other action related to confidential information or finance.

Figure 5A:
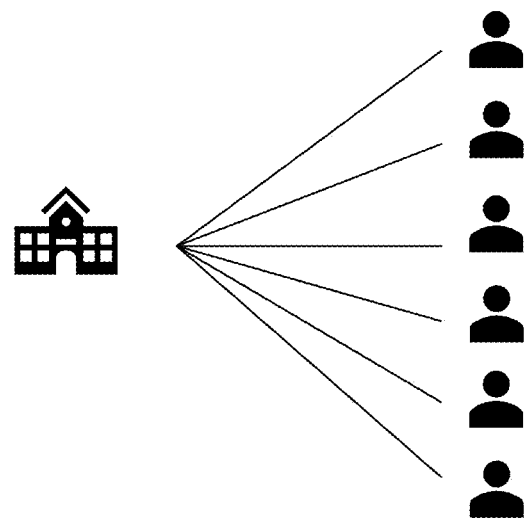
FIG. 5A illustrates an exemplary transmission of electronic communication from an enterprise source to external recipients, according to some embodiments of the present disclosure.
Figure 5B:
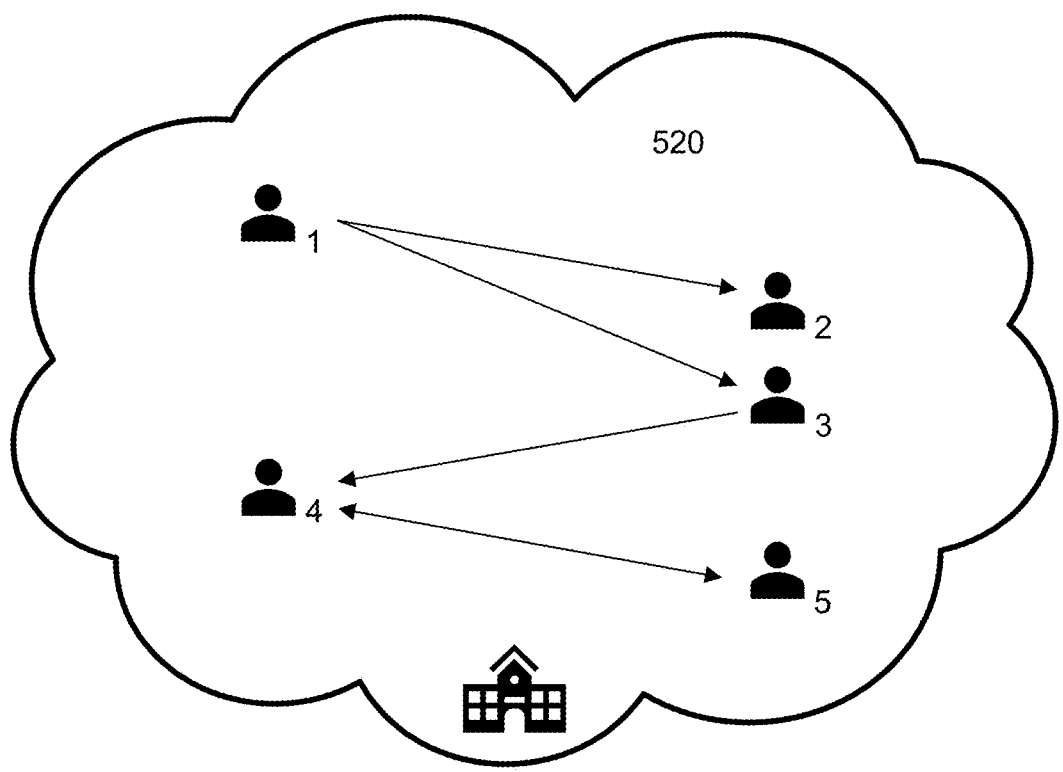
FIG. 5B illustrates an exemplary transmission of electronic communication between sources and recipients within an enterprise, according to some embodiments of the present disclosure.

Referring now to FIG. 5A, an exemplary transmission of electronic communication from an enterprise source 510 to external recipients is illustrated. Referring now to FIG. 5B, an exemplary transmission of electronic communication between sources and recipients within an enterprise 520. In some aspects, electronic communication from an enterprise source 510 may be sent to multiple recipients, wherein the recipients may want to know whether the communication is from the enterprise source 510 and not necessarily the person who may have sent it. In some embodiments, the source in communications within an enterprise 520 may be individuals, such as employees. In some implementations, the source within an enterprise may comprise departments, such as from human resources or compliance.

In some embodiments, communications within an enterprise 520 may have hierarchies of authentication. For example, a low-level employee may never send authenticable communication as their communications may never contain secure information, and each of their communications may be marked as non-authenticable, which may provide sufficient warning to any recipients that their communications should not contain confidential information. A manager may periodically send confidential information and may designate authenticable communication based on the contents of each communication. Employees from the human resources department may only send authenticable communications because all or most of their communications may relate to confidential or personal data. Employees from the finance department may only receive authenticable communications internally, which may limit the effectiveness of fraudulent internal instructions.

In some aspects, the authentication may occur on the backend of the communication exchange, wherein the sources may not be required to take an additional step to authenticate a communication. In some implementations, the authentication may occur through a third party, such as through a call center, an authentication system, or controlling department, as non-limiting examples. For example, the IT department may be responsible for authentications. In some embodiments, failed authentications may prompt further action, such as investigation, blocking of the indicated source, or blocking of the actual source, as non-limiting examples. Blocking the indicated source may be temporary until the cause of the breach is further understood.

In some embodiments, the authentication may occur one way or two way. For one-way authentication, only the source may be authenticated, and for two-way authentication, both the source and the recipient may be authenticated. Two-way authentication may be useful to confirm the correct person received the authenticable communication. Further, two-way communication may allow for the open exchange of communications where the recipient may reply to the authenticable communication and become the indicated source of the reply.

For example, a health care provider may transmit a document with information protected by HIPAA to a patient. It may be helpful or required to stay compliant to verify both the source and the recipient, which may occur automatically, manually, or a combination. A source authentication may occur automatically once the authenticable communication is transmitted, and the recipient authentication may be initiated by opening the authenticable communication. At least a portion of the contents of the authenticable communication, such as the personal or confidential material, may be obscured or blocked to the recipient until both the source and recipient are authenticated.

Figure 6:
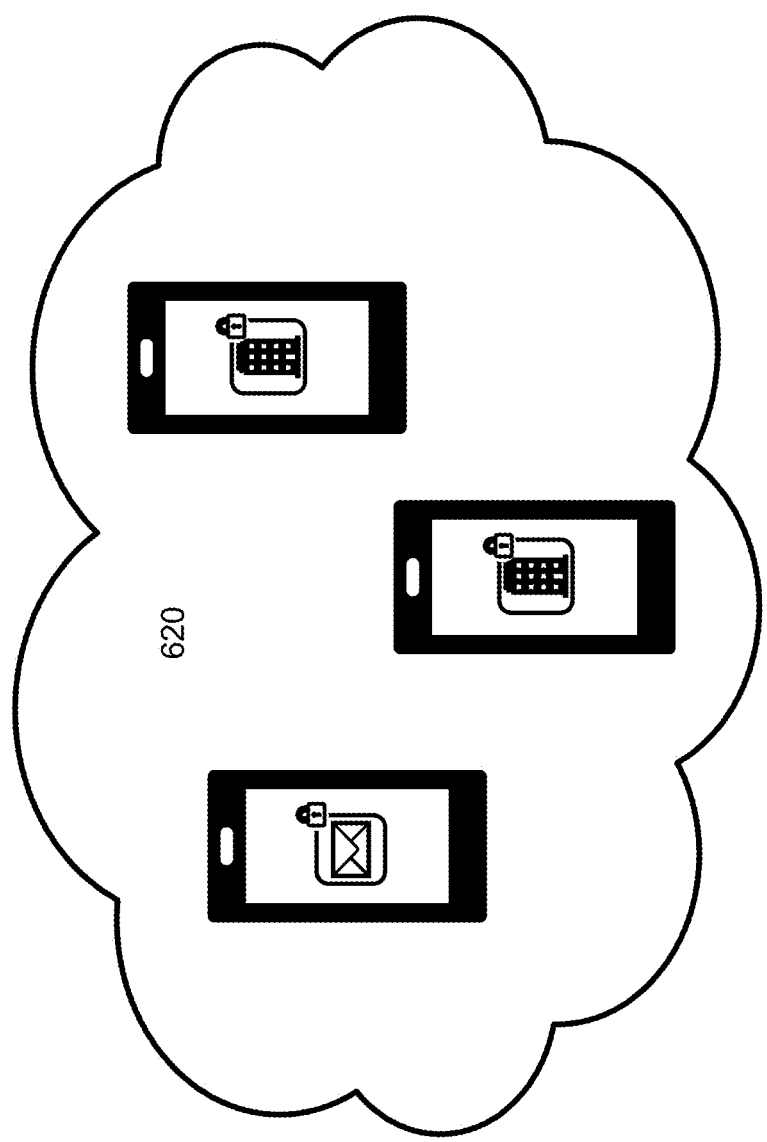
FIG. 6 illustrates an exemplary transmission of authenticable communication from an enterprise source 610 to external recipients, according to some embodiments of the present disclosure.
Figure 6:
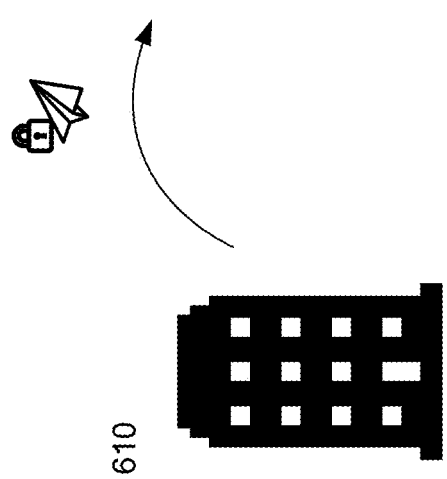

Referring now to FIG. 6, an exemplary transmission of authenticable communication from an enterprise source 610 to external recipients 620 is illustrated. In some aspects, some of the recipients may have an enterprise application on their portable device, such as a smartphone or tablet. Where the recipient may have the enterprise application, the transmission of authenticable communication may be directly through the enterprise application. In some embodiments, some of the recipients may only receive authenticable communication through a secondary communication source, such as an email application. Where the recipient may not have the enterprise application, the authenticable communication may be sent through a non-enterprise application.

In some aspects, such as where the authenticable communication may be sent through an enterprise application, the authentication methods may be less stringent than those sent through a third-party application. For example, source authentication for enterprise application authenticable communications may comprise a single authentication method that may be internal to the enterprise application, and source authentication for external authenticable communications may comprise multiple authentication methods that may require an affirmative authentication request.

Figure 7:
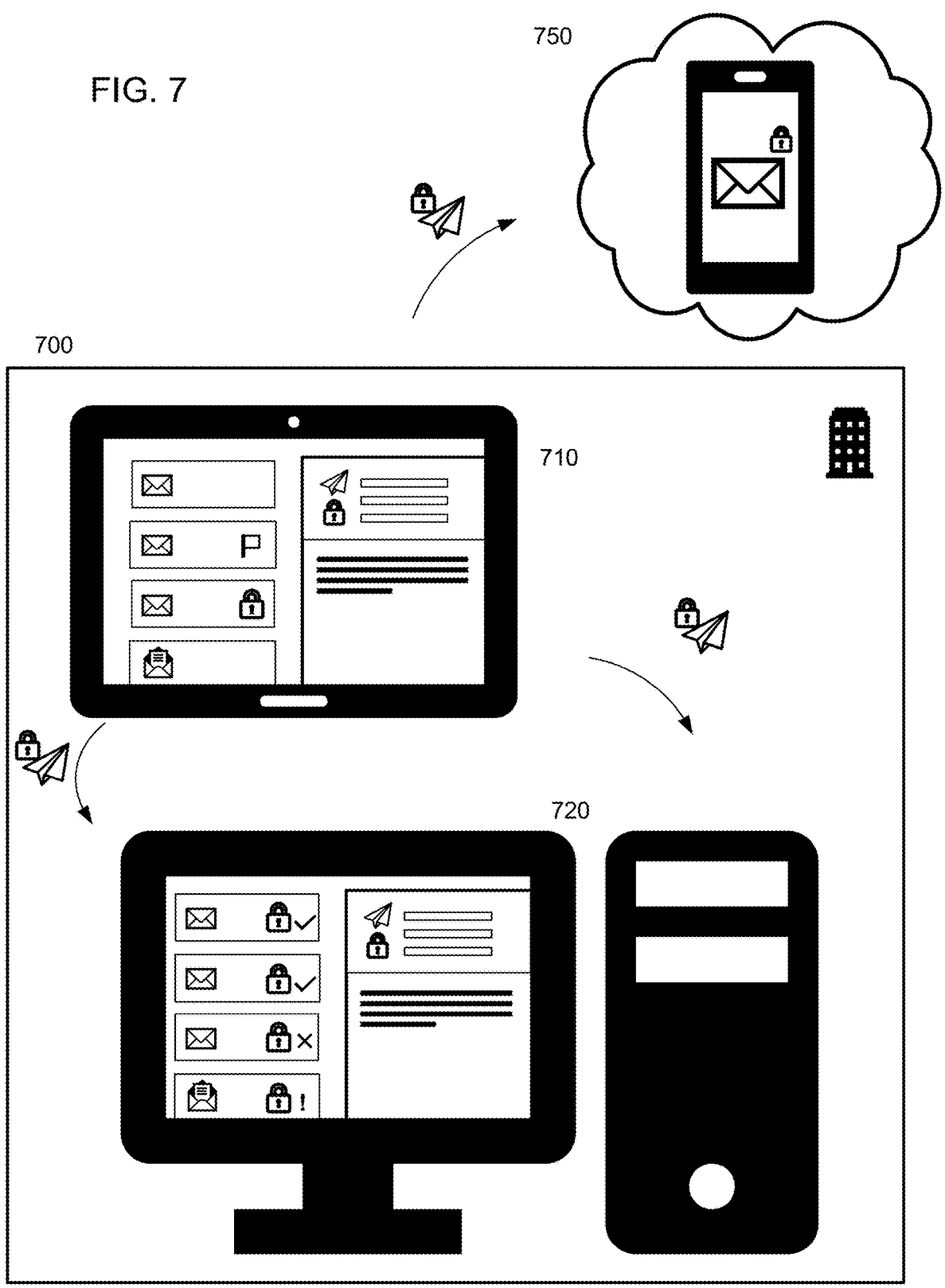
FIG. 7 illustrates exemplary authenticable communication exchanges, according to some embodiments of the present disclosure.

Referring now to FIG. 7, exemplary authenticable communication exchanges are illustrated. In some aspects, sources of authenticable communication may comprise employees within an enterprise 700. In some embodiments, a first employee 710 may exchange authenticable communications with a second employee 720. In some implementations, the indicated source may comprise an enterprise, wherein the authenticable communication may be external communications between external recipients and one or more within the enterprise, 700 and the employees 710, 720.

In some aspects, employees may have a set of permissions and email requirements. Some may be required to use secure mail for both incoming and outgoing, such as an employee responsible for the exchange of personal, private, confidential, or financial information. In some aspects, some mail types may be authenticable communication, such as those containing personal, private, confidential, or financial information. In some embodiments, the source may identify the content or mail type, which may determine whether a communication is authenticable or not. In some implementations, the source may actively flag a communication as authenticable, such as when the source wants to alert the recipient that the contents need to be authenticated. Internal emails may automatically be checked, such as through the enterprise communication infrastructure.

Figure 8:
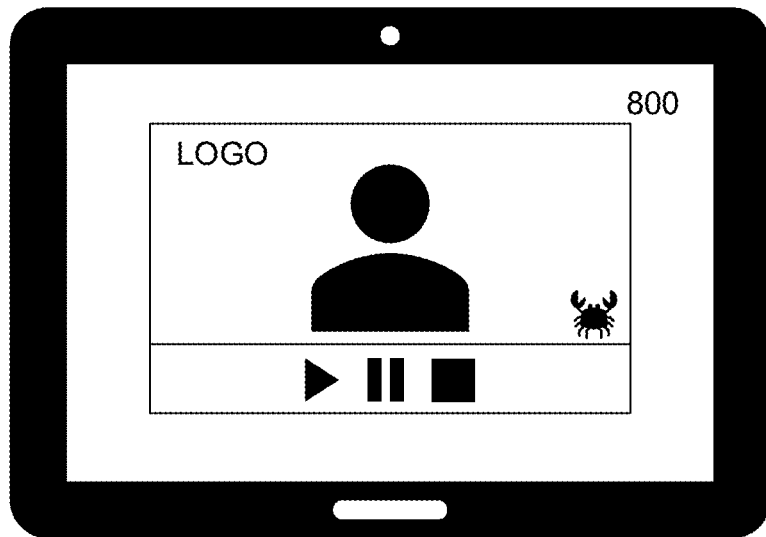
FIG. 8 illustrates an exemplary authenticable communication, wherein the authenticable communication may comprise a video.

Referring now to FIG. 8, an exemplary authenticable communication 800 is illustrated, wherein the authenticable communication 800 may comprise a video. In some aspects, the authenticable communication 800 may comprise a logo or watermark that identifies the indicated source. In some embodiments, a source may want to provide an authentication method so that a viewer may be certain that the video was actually from the source. This may limit the legitimacy of fake videos or videos incorrectly associated with an official source. In some implementations, the authentication method may comprise correctly identifying icons at a corner of the video at specific time stamps. In some embodiments, an official source may have a public authentication portal, which may allow viewers to authenticate an authenticable communication 800.

In some aspects, the authenticable communication 800 may comprise a live feed between an indicated source and a viewer, such as for telemedicine, online gaming, teleconferencing, or distance education, as non-limiting examples. Where the authenticable communication 800 may be live and ongoing, authentication may be periodic to ensure that the indicated source continues to be the actual source. For example, an authentication system may periodically prompt a viewer to input an authenticating mark on the video or may prompt a source to periodically authenticate their presence. As another example, each participant for a conference call may be considered a source, wherein each may authenticate their presence, such as through text, telephone number, email, or voice recognition, as non-limiting examples. In some aspects, participation in a teleconference may be prohibited unless and until the source is authenticated. Where the authentication occur periodically through the teleconference, a participant may be kicked out of the teleconference if an authentication fails.

As an illustrative example, a viewer may access the authentication portal on an authentication system site, the source site, or other third-party site, such as the authenticable communication 800 platform. The viewer may input an identifier for the authenticable communication 800, such as a title or label. In some aspects, the portal may immediately report that the authenticable communication 800 is not associated with the source. In some embodiments, the portal may further prompt the viewer to input an authentication mechanism, such as icons at specific time stamps. The time stamp requests may be randomly generated, which may further limit false positives.

Figure 9:
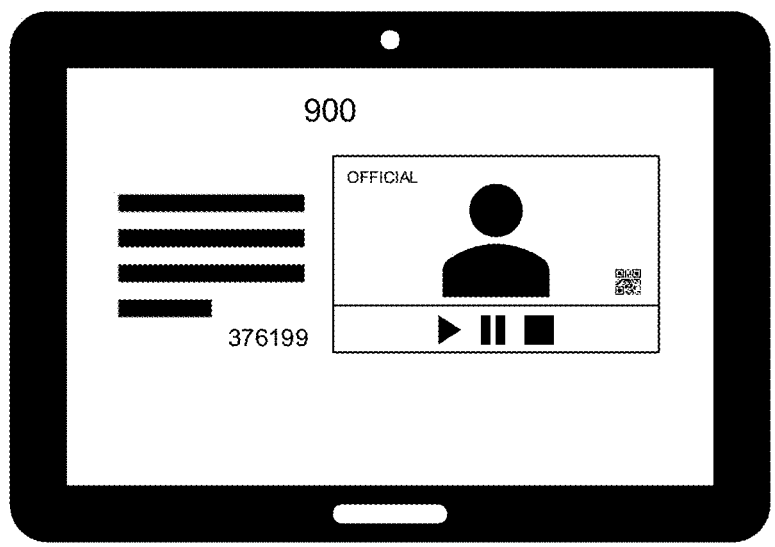
FIG. 9 illustrates an exemplary authenticable communication, wherein the authenticable communication may comprise an article with an embedded video.

Referring now to FIG. 9, an exemplary authenticable communication 900 is illustrated, wherein the authenticable communication 900 may comprise an article with an embedded video. In some aspects, one or both the article and the embedded video may be associated with an indicated source, which may be the same or different. For example, the video may be from a news source, and the article may be independently written by an individual commenting on the material of the video but not associated with the news source.

As another example, the embedded video may comprise an advertisement that may be separate from the article. In some aspects, multiple authenticable communications may be contained within the same page, interface, or document. Where the authenticable communication may comprise independent indicated sources, each portion may be independently authenticated. For example, a viewer may care to authenticate the article and may not care to authenticate the advertisement, as the viewer may not be interested in interacting with the ad. As another example, an ad may appear to be associated with the article, so a viewer may want to authenticate only the embedded video to determine whether it is an advertisement or pertinent to the article.

Where the indicated sources may be different, each portion of the authenticable communication 900 may comprise separate source authentications. In some aspects, each indicated source may have their own authentication process, such as through a phone call, authentication portal, or other mechanism. In some embodiments, both indicated sources may be authenticated through the same authentication system, which may allow for layered authentication.

As an illustrative example, the article may comprise a dual-layered authenticatable communication. A viewer may access the authentication method, input an authenticable communication identifier, such as a domain, title, or tag, and provide two authentication requests. One request may be through the content of the article, and the other request may be acquired through navigating the embedded. The indicated sources of each portion may be separately authenticated, and the combination may also be authenticated. Authenticating the combination may provide the viewer with confidence that the authenticated article actually refers to the authenticated video.

Figure 10:
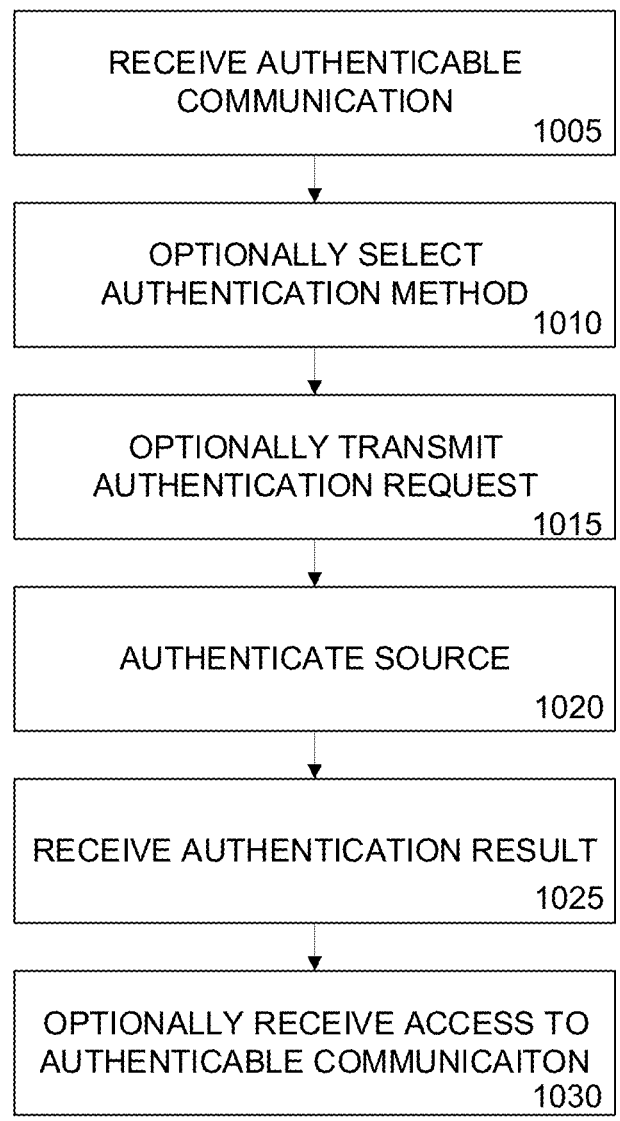
FIG. 10 illustrates exemplary method steps for requesting a source authentication, according to some embodiments of the present disclosure.

Referring now to FIG. 10, exemplary method steps for requesting a source authentication are illustrated. At 1005, an authenticable communication may be received. In some aspects, at 1010, an authentication method may be selected. In some embodiments, at 1015, an authentication request may be transmitted. At 1020, the source may be authenticated. At 1025, the authentication result may be received. In some embodiments, at 1030, access to the authenticable communication may be received. In some implementations, the steps from 1010 to 1020 may be automated on a backend, wherein a recipient may not be required to perform additional actions to initiate the authentication. In some aspects, a recipient may initiate authentication, such as through clicking an authenticate button within the communication system or by inputting authentication information into an authentication system.

In some embodiments, source authentication may be requested through a system with system protocols. For example, the authenticable communication may comprise a document sent for secure signature from a predefined person, and the source authentication may occur automatically when the executed document is received. The source authentication may confirm that the indicated source of the signer is the actual source and that the actual source matches the predefined person. In some aspects, the source authentication for an executed document may be prompted manually by a recipient trying to confirm that the predefined person actually executed the document. The source authentication may request input or scanning of a code or identifier on the document. The source authentication may prompt a secondary authenticatable communication that may be generated to ensure the indicated source of the signature is the actual source.

In some aspects, authenticable communication may comprise a point of action communication, such as a purchase of a regulated product, voting, logging into a secure Wi-Fi system, transmission of personal health data to a health provider source, scanning a ticket for entrance into a venue, purchasing a ticket, boarding transportation, or other action where confirming that the indicated source is the same as the actual source is significant. In some embodiments, authentication may be requested automatically once the action is initiated. In some aspects, authentication may be requested prior to transmission of the authenticable communication. For example, a vote in a political race may not be officially transmitted until after the authentication occurs. As another example, sale of a lottery ticket may not be fully executed and transmitted until the authentication further confirms the age of the actual source.

Figure 11:
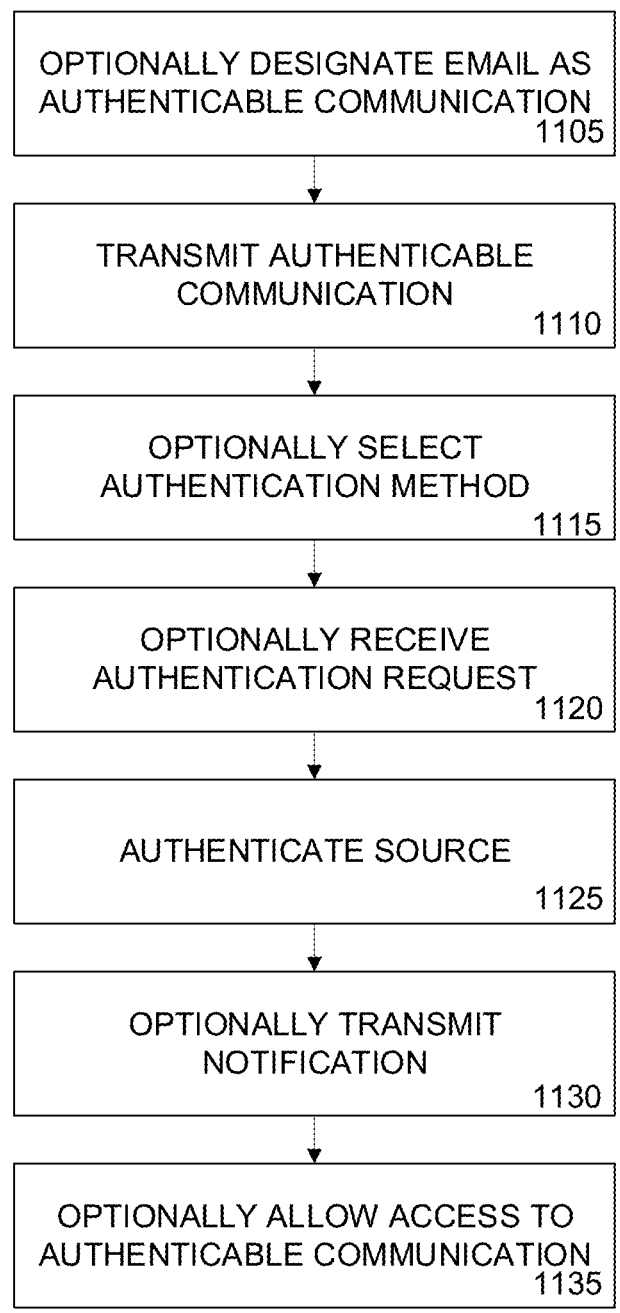
FIG. 11 illustrates exemplary method steps for transmitting an authenticable communication, according to some embodiments of the present disclosure.

Referring now to FIG. 11, exemplary method steps for transmitting an authenticable communication are illustrated. In some embodiments, at 1105, a communication may be designated as an authenticable communication. At 1110, an authenticable communication may be transmitted. In some implementations, at 1120, an authentication request may be received. At 1125, an authenticable communication may be authenticated. In some aspects, at 1130, a notification of the authentication result may be transmitted. In some embodiments, at 1135, access to the authenticable communication may be accessed. For example, wire information may be partially obscured until the source is authenticated.

Figure 12:
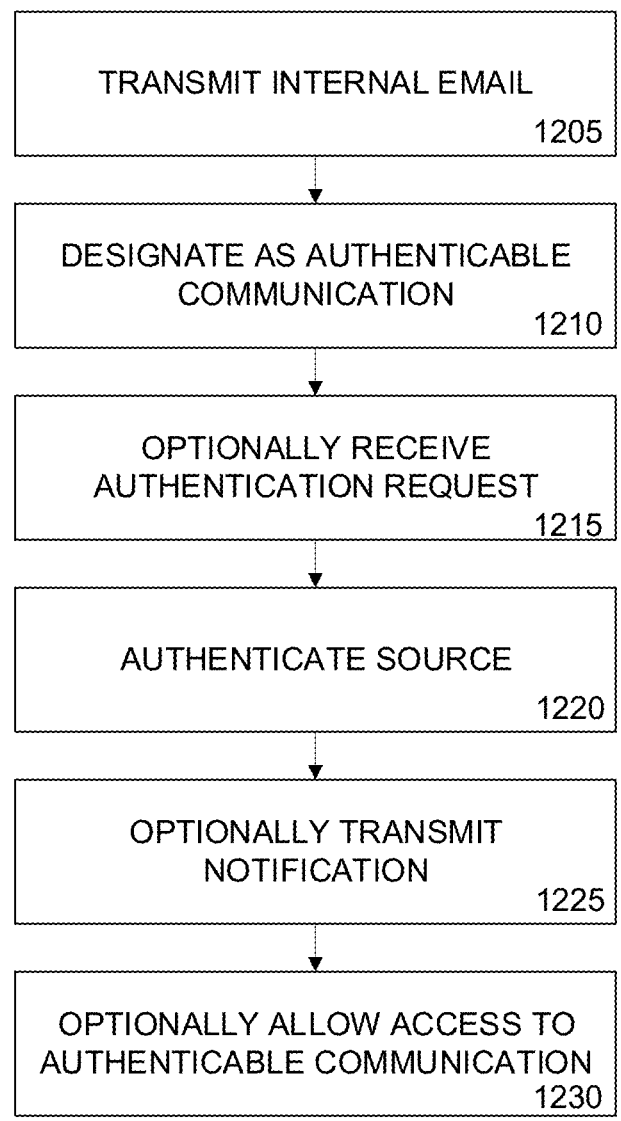
FIG. 12 illustrates exemplary method steps for transmitting an internal enterprise communication, according to some embodiments of the present disclosure.

Referring now to FIG. 12, exemplary method steps for transmitting an internal enterprise communication are illustrated. At 1205, an internal communication may be transmitted. At 1210, the internal communication may be designated as authenticable communication. In some aspects, at 1215, an authentication request may be received. At 1220, the authenticable communication may be authenticated. In some embodiments, at 1225, an authentication result may be transmitted. In some implementations, at 1230, access to the authenticable communication may be allowed.

Figure 13:
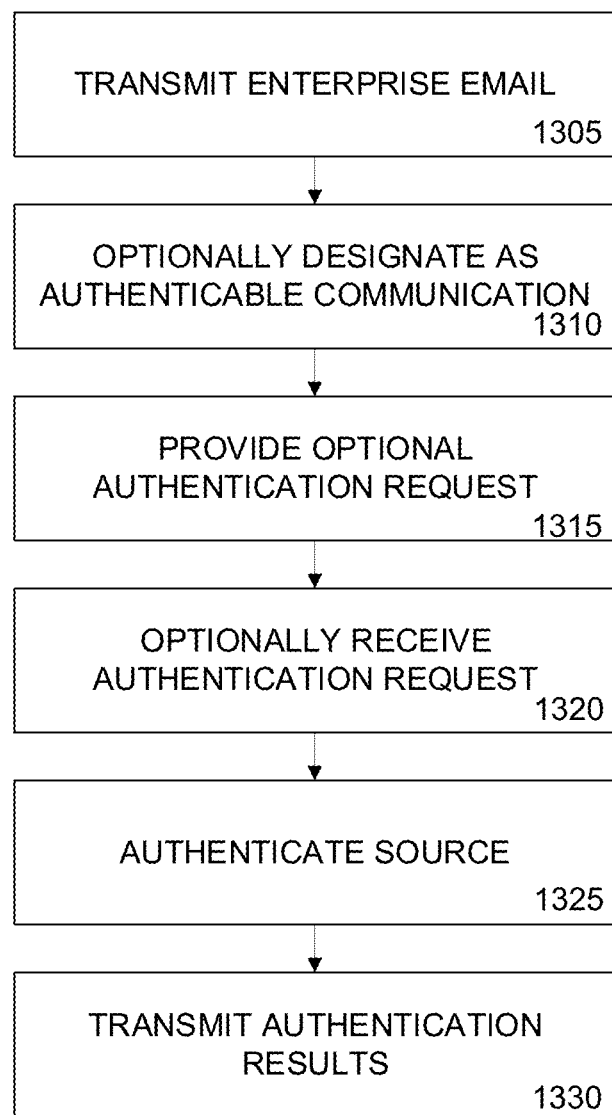
FIG. 13 illustrates exemplary method steps for transmitting an external email, according to some embodiments of the present disclosure.

Referring now to FIG. 13, exemplary method steps for transmitting an external email are illustrated. At 1305, an external enterprise email may be transmitted. In some aspects, at 1310, the enterprise email may be designated as an authenticable communication. At 1315, an authentication request option may be provided within the authenticable communication. In some embodiments, at 1320, an authentication request may be received. At 1325, the authenticable communication may be authenticated. At 1330, the authentication results may be transmitted.

Figure 14:
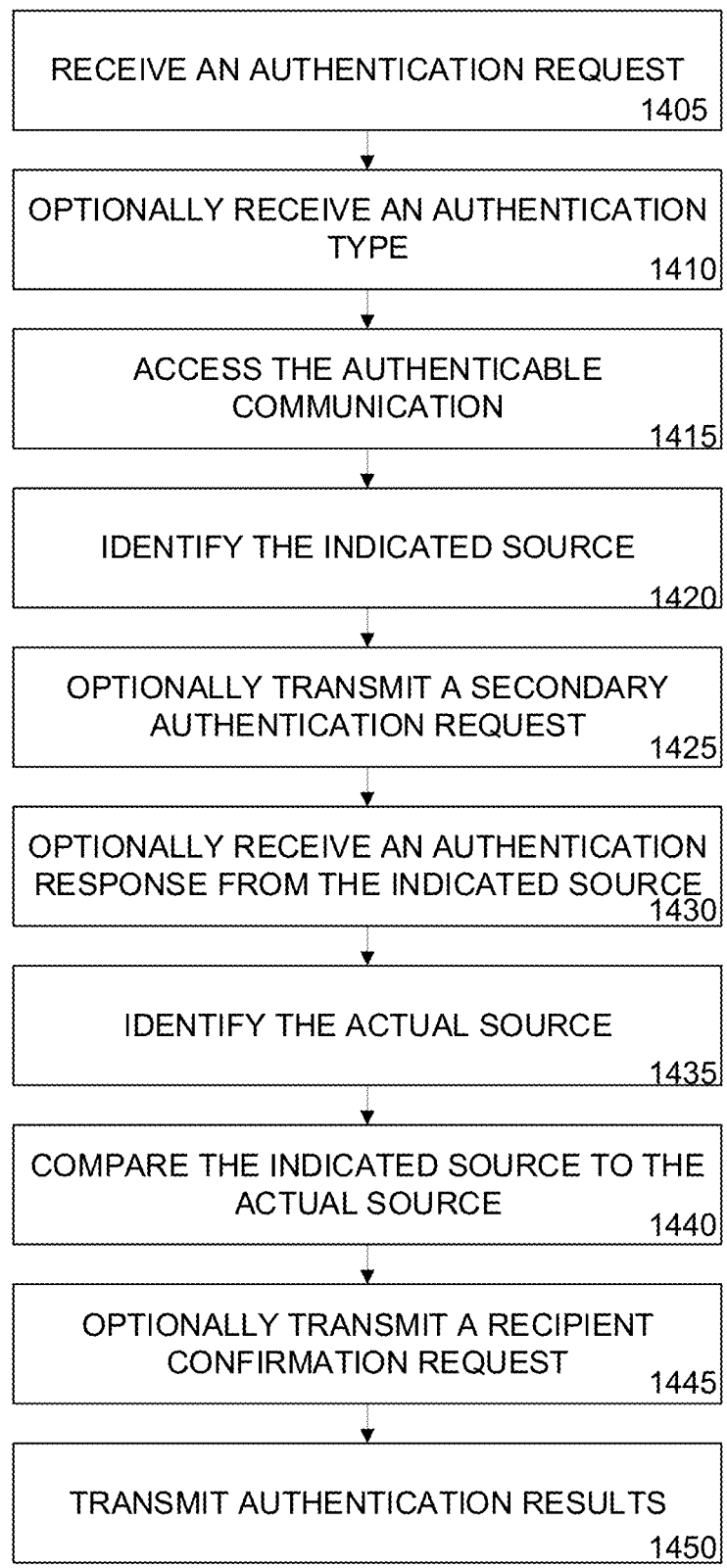
FIG. 14 illustrates exemplary method steps for authenticating a source of an authenticable communication, according to some embodiments of the present disclosure.

Referring now to FIG. 14, exemplary method steps for authentication a source of an authenticable communication is illustrated. At 1405, an authentication request may be received. In some aspects, at 1410, an authentication type may be received, such as where the authentication type may be selectable by one or both the recipient and the actual source. At 1415, the authenticable communication may be accessed. At 1420, the indicated source may be identified.

In some embodiments, at 1425, a secondary authentication request may be transmitted, such as to the indicated source, which may prompt an action from the indicated source, and at 1430, the authentication response from the indicated source may be received. At 1435, the actual source may be identified, which may be informed at least in part by the authentication response received at 1430. At 1440, the indicated source may be compared to the actual source.

In some implementations, at 1445, a recipient confirmation request may be sent to the indicated source to confirm that the recipient or recipients were the intended recipients of the authenticable communication. At 1450, the authentication results may be transmitted. In some aspects, the authentication results may be transmitted to the authentication system, which may trigger access for the recipient to the contents of the authenticable communication. In some embodiments, the authentication may occur internally and automatically within the system without notifications or prompts sent to the recipient or the indicated source. In some implementations, portions of the process may include notifications or prompts to one or more of the indicated source, the actual source, and the recipient.

For example, where security may increase confidence in the authenticable communication, transmitting the authentication results at 1450 to the recipient may reassure the recipient that the authenticable communication is real and safe. As another example, such as with exchange of external authenticable communications, the enterprise may be concerned with internal cybersecurity issues that may not affect or even be considered by the indicated source and the recipient. There, the system may perform the authentication internally without providing results to the indicated source or the recipients.

Figure 15:
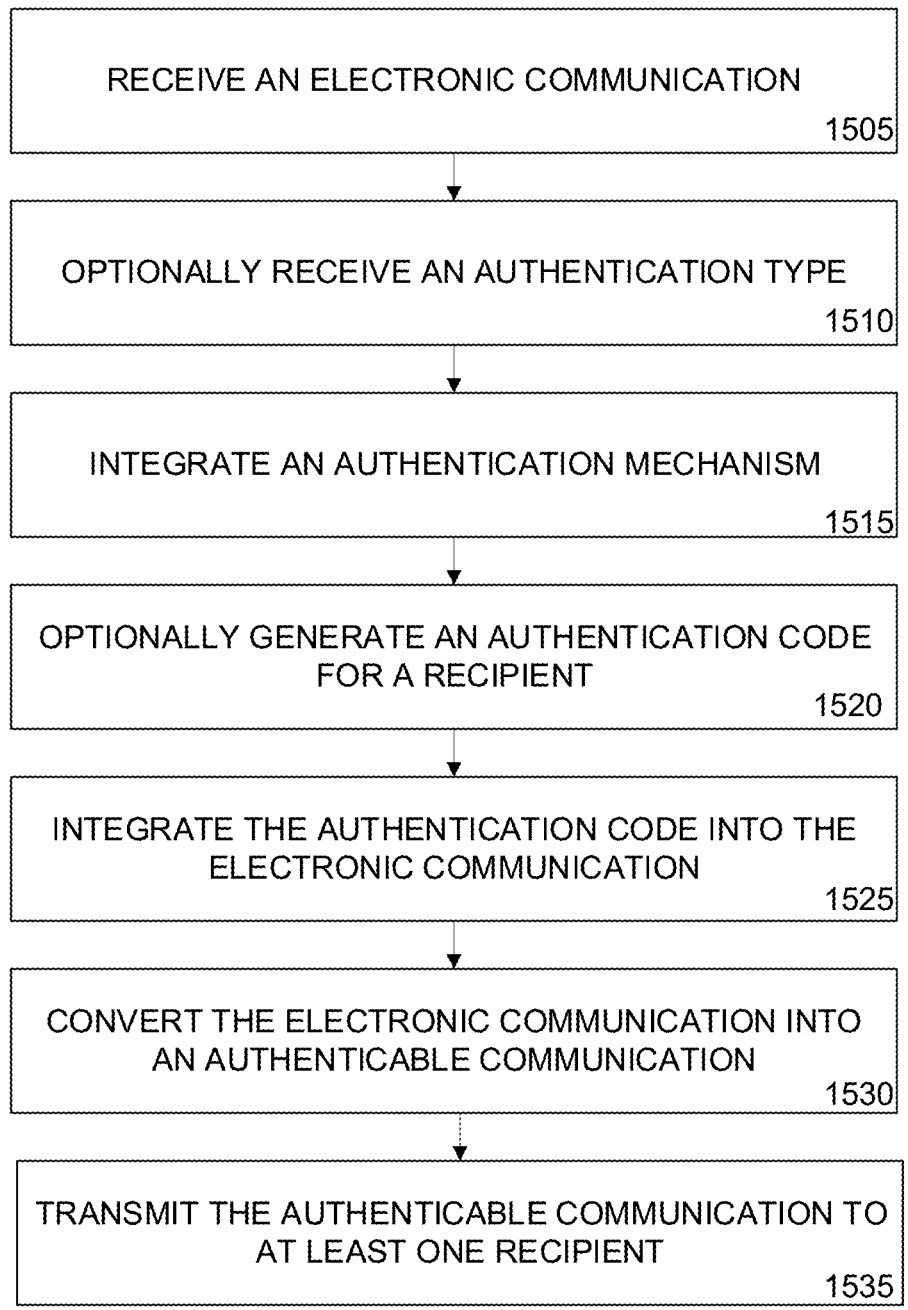
FIG. 15 illustrates exemplary method steps for providing an authenticable communication

Referring now to FIG. 15, exemplary method steps for providing an authenticable communication are illustrated. At 1505, an electronic communication may be received. In some aspects, at 1510, an authentication type may be received, such as may be set or selected by an actual source, a recipient, or enterprise. At 1515, an authentication mechanism may be integrated into the electronic communication. In some embodiments, at 1520, an authentication code may be generated for the recipient or recipients, wherein the authentication code may be unique to each recipient or general based on the indicated source. At 1525, the authentication code into the electronic communication. At 1530, the electronic communication may be converted to an authenticable communication, and at 1535, the authenticable communication may be transmitted to at least one recipient.

In some implementations, the authenticable communication may be presented to the actual source prior to the transmission at 1535.

Figure 16:
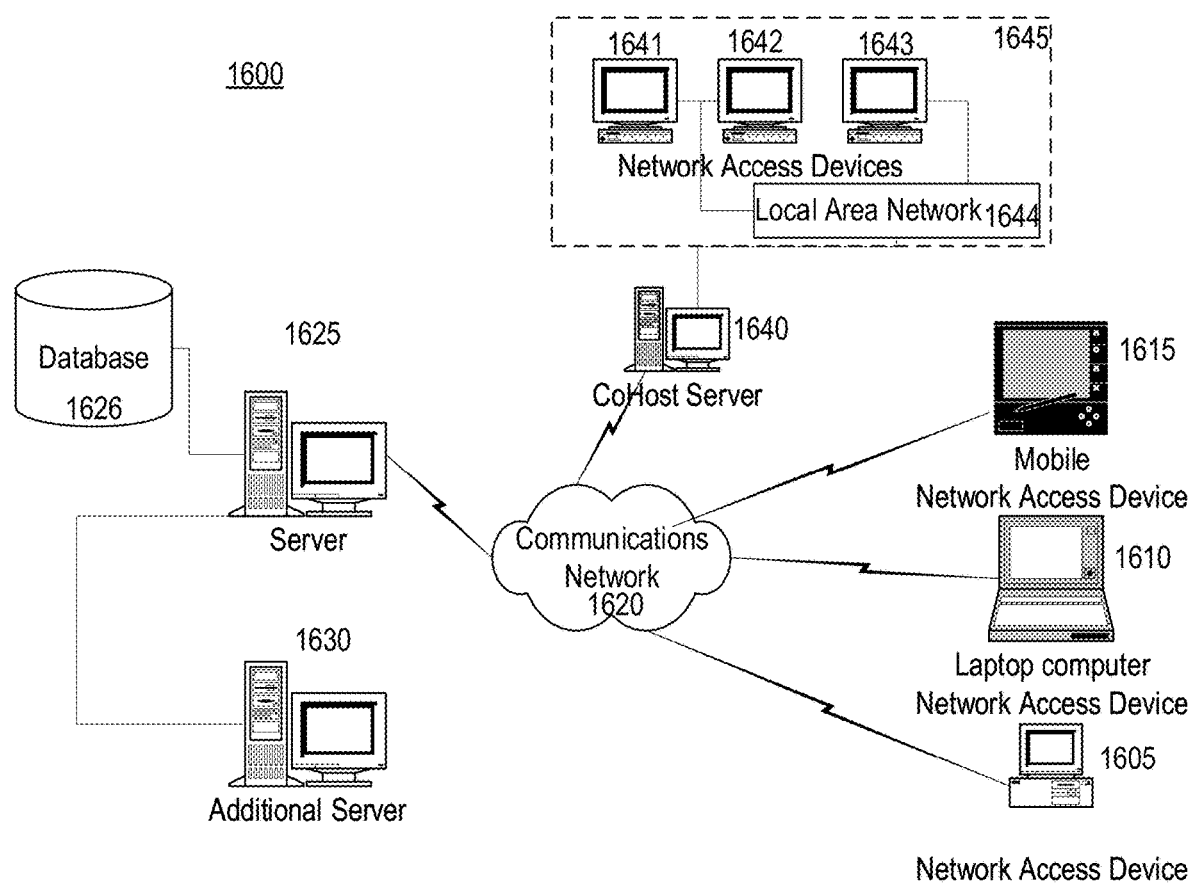
FIG. 16 illustrates an exemplary processing and interface system, according to some embodiments of the present disclosure.

Referring now to FIG. 16, an exemplary processing and interface system 1600 is illustrated. In some aspects, access devices 1615, 1610, 1605, such as a paired portable device 1615 or laptop computer 1610 may be able to communicate with an external server 1625 through a communications network 1620. The external server 1625 may be in logical communication with a database 1626, which may comprise data related to identification information and associated profile information. In some embodiments, the server 1625 may be in logical communication with an additional server 1630, which may comprise supplemental processing capabilities.

In some aspects, the server 1625 and access devices 1605, 1610, 1615 may be able to communicate with a cohost server 1640 through a communications network 1620. The cohost server 1640 may be in logical communication with an internal network 1645 comprising network access devices 1641, 1642, 1643 and a local area network 1644. For example, the cohost server 1640 may comprise a payment service, such as PayPal or a social network, such as Facebook or a dating website.

Figure 17:
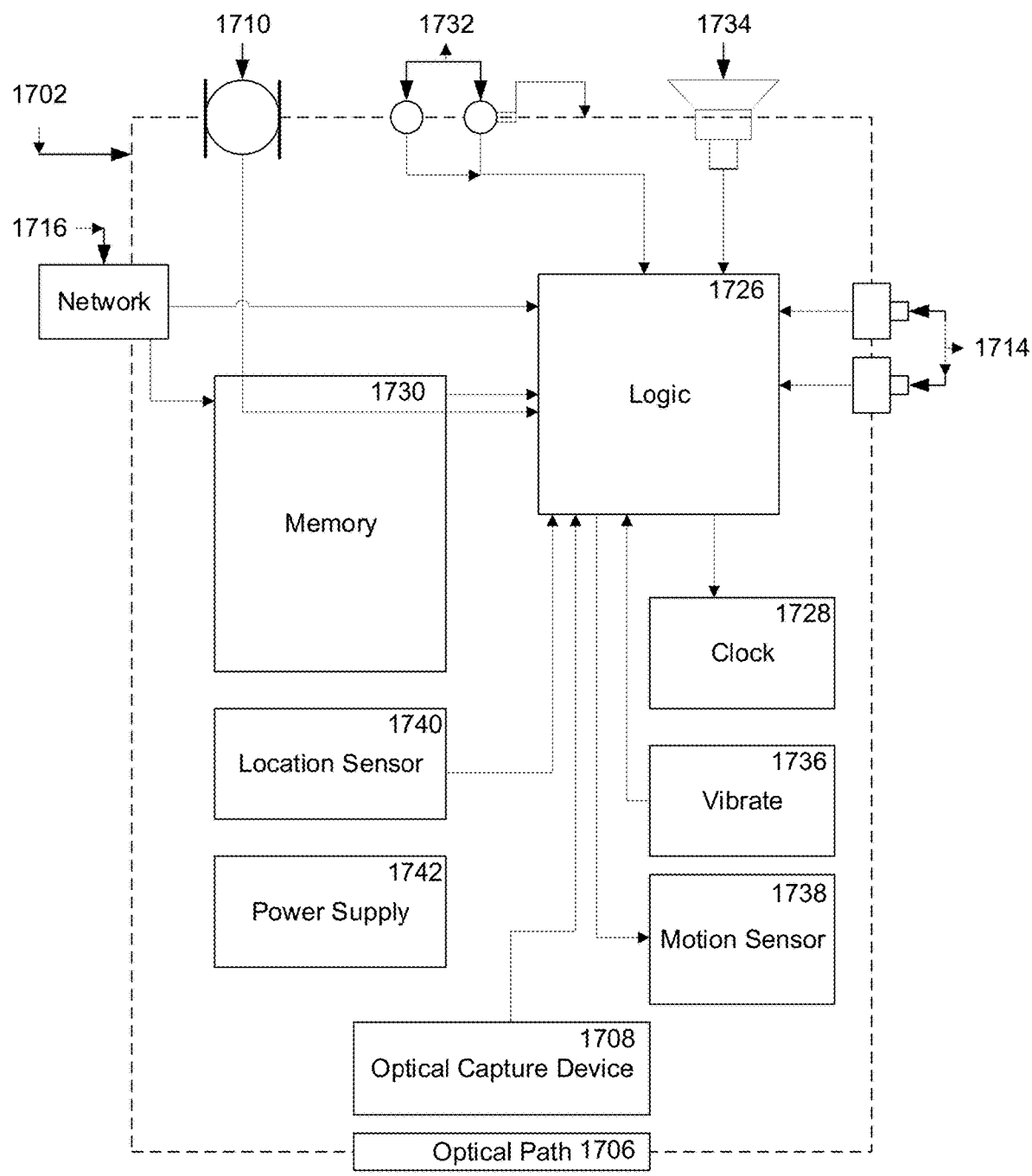
FIG. 17 illustrates an exemplary block diagram of an exemplary embodiment of a mobile device, according to some embodiments of the present disclosure.

Referring now to FIG. 17, an exemplary block diagram of an exemplary embodiment of a mobile device 1702 is illustrated. The mobile device 1702 may comprise an optical capture device 1708, which may capture an image and convert it to machine-compatible data, and an optical path 1706, typically a lens, an aperture, or an image conduit to convey the image from the rendered document to the optical capture device 1708. The optical capture device 1708 may incorporate a Charge-Coupled Device (CCD), a Complementary Metal Oxide Semiconductor (CMOS) imaging device, or an optical sensor of another type.

In some embodiments, the mobile device 1702 may comprise a microphone 1710, wherein the microphone 1710 and associated circuitry may convert the sound of the environment, including spoken words, into machine-compatible signals. Input facilities 1715 may exist in the form of buttons, scroll-wheels, or other tactile sensors such as touchpads. In some embodiments, input facilities 1714 may include a touchscreen display. Visual feedback 1732 to the user may occur through a visual display, touchscreen display, or indicator lights. Audible feedback 1734 may be transmitted through a loudspeaker or other audio transducer. Tactile feedback may be provided through a vibration module 1736.

In some aspects, the mobile device 1702 may comprise a motion sensor 1738, wherein the motion sensor 1738 and associated circuitry may convert the motion of the mobile device 1702 into machine-compatible signals. For example, the motion sensor 1738 may comprise an accelerometer, which may be used to sense measurable physical acceleration, orientation, vibration, and other movements. In some embodiments, the motion sensor 1738 may comprise a gyroscope or other device to sense different motions.

In some implementations, the mobile device 1702 may comprise a location sensor 1740, wherein the location sensor 1740 and associated circuitry may be used to determine the location of the device. The location sensor 1740 may detect Global Position System (GPS) radio signals from satellites or may also use assisted GPS where the mobile device may use a cellular network to decrease the time necessary to determine location. In some embodiments, the location sensor 1740 may use radio waves to determine the distance from known radio sources such as cellular towers to determine the location of the mobile device 1702. In some embodiments these radio signals may be used in addition to and/or in conjunction with GPS.

In some aspects, the mobile device 1702 may comprise a logic module 1726, which may place the components of the mobile device 1702 into electrical and logical communication. The electrical and logical communication may allow the components to interact. Accordingly, in some embodiments, the received signals from the components may be processed into different formats and/or interpretations to allow for the logical communication. The logic module 1726 may be operable to read and write data and program instructions stored in associated storage 1730, such as RAM, ROM, flash, or other suitable memory. In some aspects, the logic module 1726 may read a time signal from the clock unit 1728. In some embodiments, the mobile device 1702 may comprise an on-board power supply 1732. In some embodiments, the mobile device 1702 may be powered from a tethered connection to another device, such as a Universal Serial Bus (USB) connection.

In some implementations, the mobile device 1702 may comprise a network interface 1716, which may allow the mobile device 1702 to communicate and/or receive data to a network and/or an associated computing device. The network interface 1716 may provide two-way data communication. For example, the network interface 1716 may operate according to an internet protocol. As another example, the network interface 1716 may comprise a local area network (LAN) card, which may allow a data communication connection to a compatible LAN. As another example, the network interface 1716 may comprise a cellular antenna and associated circuitry, which may allow the mobile device to communicate over standard wireless data communication networks. In some implementations, the network interface 1716 may comprise a Universal Serial Bus (USB) to supply power or transmit data. In some embodiments, other wireless links known to those skilled in the art may also be implemented.

Conclusion

A number of embodiments of the present disclosure have been described. While this specification contains many specific implementation details, this should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for providing authenticable communication, wherein the system comprises:
   one or more processors;
   one or more memory resources comprising:
   an authentication mechanism database;
   an indicated source database; and
   wherein the one or more memory resources are connectable to one or more external device through a communications network, wherein at least one of the one or more external devices comprises an authenticable communication transmittal mechanism and at least one of the one or more external devices comprises an authenticable communication receiving mechanism, wherein the one or more memory resources are executable by the one or more processors to perform the steps of:
   receiving an electronic communication comprising at least an indicated source comprising an apparent source, at least one recipient, and content;
   converting the electronic communication to an authenticable communication, wherein converting comprises embedding at least one source authentication mechanism into the electronic communication, wherein the at least one source authentication mechanism allows the at least one recipient to authenticate the indicated source as an actual source, wherein the actual source comprises a true source;
   transmitting the authenticable communication to the at least one recipient, wherein authentication of the authenticable communication is requestable by each of the at least one recipient, wherein authentication comprises a comparison of the indicated source to the actual source, and wherein a requested authentication transmits a secondary authentication request to one or both the indicated source or the indicated source database.

2. The system of claim 1, wherein the at least one source authentication mechanism is selectable by the indicated source.

3. The system of claim 1, wherein the at least one source authentication mechanism is selectable by the at least one recipient.

4. The system of claim 1, wherein the at least one source authentication mechanism comprises generation of an authentication code, wherein the authentication code is used to confirm that the indicated source is the actual source.

5. The system of claim 4, wherein each of the at least one recipient receives a unique authentication code.

6. A system for providing source authentication for authenticable communication, wherein the system comprises:
one or more processors;
one or more memory resources comprising:
an authentication mechanism database;
an indicated source database;
wherein the one or more memory resources are connectable to external devices through a communications network, wherein at least one external device comprises an authenticable communication transmittal mechanism and at least one external device comprises an authenticable communication receiving mechanism, wherein the one or more memory resources are executable by the one or more processors to perform the steps of:
receiving a primary authentication request for an authenticable communication, wherein the authenticable communication comprises an indicated source, one or more recipient, and content;
accessing the authenticable communication;
identifying an indicated source of the authenticable communication, wherein the indicated source comprises an apparent source;
transmitting a secondary authentication request to one or both the indicated source or the indicated source database;
receiving a response from one or both the indicated source or the indicated source database;
identifying an actual source of the authenticable communication based on the response, wherein the actual source comprises a true source;
authenticating the authenticable communication by comparing the indicated source to the actual source, wherein comparing produces an authentication result that confirms whether the indicated source and the actual source are the same; and
transmitting the authentication result.

7. The system of claim 6, wherein the one or more memory resources are further executable to perform the steps of:
receiving an authentication type with the primary authentication request, wherein a method for identifying the actual source is based on the authentication type.

8. The system of claim 6, wherein the primary authentication request is received automatically when each of the one or more recipient of the authenticable communication accesses the authenticable communication.

9. The system of claim 6, wherein the primary authentication request is received automatically when each of the one or more recipient of the authenticable communication transmits the primary authentication request.

10. The system of claim 6, wherein contents of the authenticable communication are accessible if the authentication results indicates that the indicated source is the actual source.

11. The system of claim 6, wherein receiving a primary authentication request occurs within a software application provided by the indicated source.

12. The system of claim 1, wherein the one or more memory resources are further executable to perform the steps of:
transmitting a recipient confirmation request to the indicated source, wherein the recipient confirmation request prompts confirmation that each of the one or more recipient is permitted to view the content.

13. A computer-implemented method for authenticating a source of an authenticable communication, the computer-implemented method comprising method steps of:
receiving a primary authentication request for an authenticable communication, wherein the authenticable communication comprises an indicated source, one or more recipient, and content;
accessing the authenticable communication;
identifying an indicated source of the authenticable communication, wherein the indicated source comprises an apparent source;
transmitting a secondary authentication request to one or both the indicated source or an indicated source database;
receiving a response from one or both the indicated source or the indicated source database;
identifying an actual source of the authenticable communication based on the response, wherein the actual source comprises a true source;
authenticating the authenticable communication by comparing the indicated source to the actual source, wherein comparing produces an authentication result that confirms whether the indicated source and the actual source are the same; and
transmitting the authentication result.

14. The computer-implemented method of claim 13, further comprising the steps of:
receiving an authentication type with the primary authentication request, wherein a method for identifying the actual source is based on the authentication type.

15. The computer-implemented method of claim 13, wherein the primary authentication request is received automatically when each of the one or more recipient of the authenticable communication accesses the authenticable communication.

16. The computer-implemented method of claim 13, wherein the primary authentication request is received automatically when each of the one or more recipient of the authenticable communication transmits the primary authentication request.

17. The computer-implemented method of claim 13, wherein contents of the authenticable communication are accessible if the authentication results indicates that the indicated source is the actual source.

18. The computer-implemented method of claim 17, further comprising the method steps of:
transmitting a recipient confirmation request to the indicated source, wherein the recipient confirmation request prompts confirmation that each of the one or more recipient is permitted to view the content.

* * * * *